UNITED STATES PATENT OFFICE 2,376,433

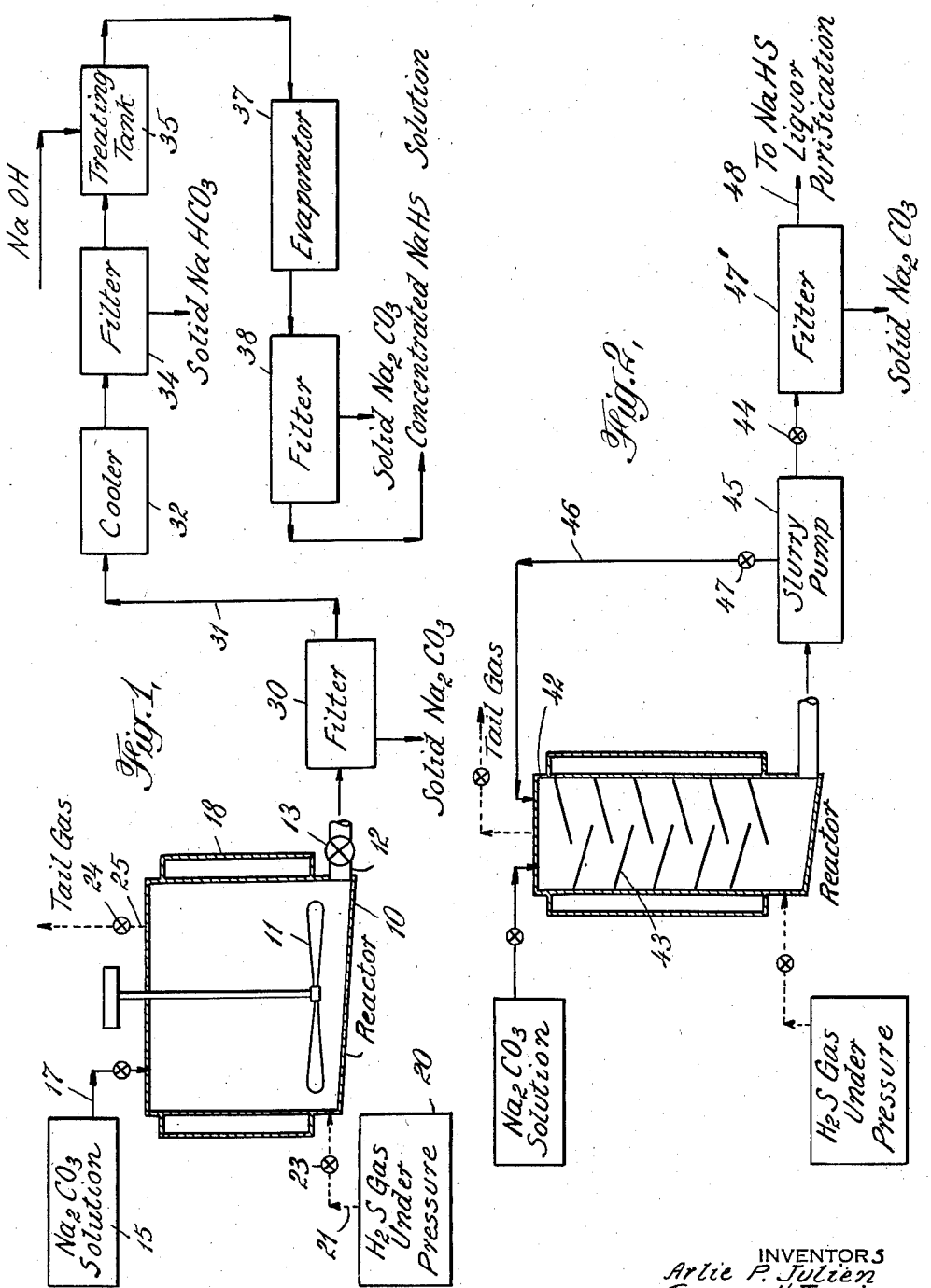

MANUFACTURE OF SODIUM HYDROSULPHIDES

Arlie Paul Julien, Syracuse, and George N. Terziev, Solvay, N. Y., assignors to The Solvay Process Company, New York, N. Y., a corporation of New York Application February 17, 1944, Serial No. 522,794

14 Claims. (Cl. 23—134)

This invention relates to manufacture of sodium hydrosulphide (NaHS) or sodium sulphide ($Na_2S$) or mixtures of both.

With the exception of a very small amount, all commercial grades of sodium sulphide are made from salt cake ($Na_2SO_4$) or nitre cake ($NaHSO_4$) by reduction with coal or coke at elevated temperatures. The reaction is usually carried out in reverberatory or rotary furnaces, and the furnaced material is put thru a relatively elaborate and cumbersome $Na_2S$ recovery and purification procedure. Such process is inherently complicated and costly, and moreover results in an end product containing a substantial quantity of impurities, particularly iron. Sodium hydrosulphide may be formed by gassing sodium sulphide liquor with hydrogen sulfide. In this procedure, the initial source of sodium is relatively expensive caustic soda. Further, it is known that sodium sulphide may be made by treating an NaHS liquor with sodium hydroxide.

It is known that sodium carbonate ($Na_2CO_3$) reacts with $H_2S$ to form NaHS. Attempts have been made to produce NaHS by gassing a liquor containing sodium carbonate with hydrogen sulphide. While these proposals bring about formation of some NaHS which remains in solution, it is recognized that the proportion of the sodium content of the liquor subjected to gassing which precipitated as acid carbonate of sodium (mostly $Na_2CO_3.NaHCO_3.2H_2O$ and $NaHCO_3$) was so great and the loss of sodium as precipitate was so high as to render processes of such nature uneconomical. To avoid this deficiency, it has been proposed to add lime to the reaction mixture, in which case it appears that $Ca(OH)_2$ reacts with $H_2S$ to form $Ca(HS)_2$ which in turn reacts with $Na_2CO_3$ to produce NaHS and $CaCO_3$. It has also been suggested to react $H_2S$ and solid $Na_2CO_3$ at temperatures of the order of 400–850° C. The former proposal requires the use of a relatively large amount of a foreign reactant, and the latter process involves the disadvantages of high temperature operations. Our investigations indicate the foregoing difficulties encountered in the reaction of $H_2S$ and $Na_2CO_3$ in water solution are attributable to lack of knowledge of conditions under which the $H_2S$ gassing operation should be carried out. As far as we know, there is no commercial production of sodium hydrosulphide or sodium sulphide by reaction of sodium carbonate and hydrogen sulphide.

Practice of the invention involves gassing an aqueous solution containing sodium carbonate with an $H_2S$ gas to effect reaction of $Na_2CO_3$ and $H_2S$ to form NaHS. A chief object of the invention is provision of processes the practice of which makes it possible to carry out the sodium carbonate liquor-$H_2S$ gassing operation in such a way that (1) sodium acid carbonate, necessarily formed during $H_2S$ gassing and formed in solid phase in the early stages of such gassing, may be decomposed to such an extent that the ultimate reaction mass contains substantially no solid-phase sodium acid carbonate, and so that the amount of sodium acid carbonate present in solution in the final NaHS solution is held at an economical low level, and (2) good conversion of $Na_2CO_3$ to NaHS may be obtained. Further purpose of the invention is to afford accomplishment of the foregoing objects and at the same time utilize, as a source of sodium, commercial soda ash which is cheaper than caustic soda.

While it is evident that sodium acid carbonates, which are formed and tend to separate out in solid phase from liquors such as handled in the invention process, include sodium sesqui-carbonate, $Na_2CO_3.NaHCO_3.2H_2O$, and decimite, $$Na_2CO_3.3NaHCO_3$$

as well as a major amount of sodium bicarbonate itself, unless otherwise specified mention of sodium acid bicarbonate herein is intended, for convenience, to include all sodium acid carbonates present.

The process of the invention comprises first, formation of aqueous sodium carbonate starting liquors, utilizing commercial soda ash as the raw material; second, a reaction stage in which the sodium carbonate liquor is contacted under certain conditions with hydrogen sulphide gas to convert $Na_2CO_3$ to NaHS; and third, a purification stage in which the NaHS liquor discharged from the reaction stage is handled in accordance with certain further principles of the invention to effect purification of the NaHS product solution with respect to removal of soluble sodium acid carbonate and soluble unreacted sodium carbonate which may be present.

In the course of $H_2S$ gassing, of an aqueous solution of $Na_2CO_3$, $Na_2CO_3$ reacts with $H_2S$ to produce NaHS and $NaHCO_3$. We have discovered that under certain temperature conditions, most, and if desired substantially all, of the $NaHCO_3$ formed may be broken down by heat to $Na_2CO_3$, $CO_2$ and water, and such $Na_2CO_3$ is made available for reaction with further $H_2S$ to make more NaHS. We find that in order to enhance reaction of $H_2S$ and sodium carbonate, to prevent the substantial presence of solid-phase sodium acid carbonate in the ultimate reacted mass, to hasten decomposition of sodium acid carbonate and effect stripping out and discharge from the contacting zone of $CO_2$ initially combined with $Na_2CO_3$ and thus minimize the quantity of acid sodium carbonate present in solution in the liquor discharged from the contacting reaction, the sodium carbonate-$H_2S$ gassing operation should be carried out while maintaining, in the contacting zone, temperature not less than 100° C. and not more than 125° C. Preferred operating temperatures are in the range of 105–115° C. While temperatures above 125° C. may be used, higher temperatures are not preferred because of greatly increased equipment corrosion.

The preferred starting solution is a saturated aqueous $Na_2CO_3$ solution containing substantially no sodium salt other than $Na_2CO_3$. The solution may be saturated either at room temperature or at temperature of say 100° C. Such a solution may be made by adding the proper amount of commercial soda ash to water. The starting solutions need not necessarily be saturated. The starting solutions may contain some NaHS or sodium acid carbonate or both, but preferably the sodium salt content should be predominantly $Na_2CO_3$ as such.

Another factor of importance is the pressure conditions under which $H_2S$ gassing is carried out. Specific pressure to be used is dependent upon the particular temperature prevailing in the reaction zone. Solutions of the type employed for $H_2S$ gassing in accordance with the present invention have boiling points of the order of 105° C. Thus if reaction zone temperature is say 100–103° C., it is possible to proceed at atmospheric pressure. However, preferred reaction temperatures are 105° C. and above, and accordingly the solution being gassed should be subjected to superatmospheric pressure sufficient to facilitate maintenance of particular reaction temperature prevailing in the gassing zone. Pressures up to 30 lbs. gauge may be used, pressures in the preferred temperature range of 105–115° C. being about 5–20 lbs. gauge.

The feature of pressure is of importance from another angle. When working with starting solutions which are initially saturated with respect to $Na_2CO_3$ or total sodium salt content, it is preferred to carry out $H_2S$ gassing under conditions, e. g. of refluxing or pressure, such as to prevent any substantial loss of water other than that which incidentally and necessarily passes off entrained in the reaction zone tail gas. This procedure avoids precipitation of solid $Na_2CO_3$ or other sodium salt which would be held in solution if there were no substantial depletion of the amount of water in the reaction zone. When using starting solutions which are substantially less than saturated, boiling and loss of water is not objectionable in the early stages of gassing, but when loss of water reaches the point at which the reacting solution becomes saturated, thereafter prevention of substantial loss of water is preferred for the same reason as when using an initially saturated starting solution. Accordingly, in practice, pressures used are adjusted in accordance with the foregoing features of temperature and water loss.

In practice, the gases which may be employed include pure $H_2S$ gas, $H_2S$ gas containing diluents inert to the reaction, or an $H_2S$ gas containing a diluent such as $CO_2$ which is not inert to the reaction, i. e. $CO_2$ reacts in water solution with $Na_2CO_3$ to form $NaHCO_3$. In the case of $H_2S$ gases containing diluents inert to the reaction, $H_2S$ concentration may be any feasible value, and best results may be obtained by use of an $H_2S$ gas containing substantially no $CO_2$. In order to avoid the presence of excessive $NaHCO_3$ in the system, if the $H_2S$ gas used contains $CO_2$, such incoming $H_2S$ gas should contain by volume not more $CO_2$ than $H_2S$. In all operations, it is preferred to employ gases containing not less than 50% $H_2S$ by volume and if such gases contain $CO_2$, concentration of the latter should be not above 25% by volume, i. e. $CO_2$ content is preferably not more than half the $H_2S$ content by volume. Commercially obtainable gases, e. g. from petroleum refineries, often contain about 90% $H_2S$ and about 10% $CO_2$ by volume. The $H_2S$ employed is held at its source under pressure of say 30–40 lbs. gauge.

We have found that, if the liquor undergoing gassing is retained in the reaction zone for a sufficient extended time interval and subjected to the control features above stated, it is possible to break down the initially formed solid-phase acid carbonate and to minimize the amount of sodium acid carbonate present in the final NaHS solution. Particularly in cases in which the gas used is pure $H_2S$ or contains substantially no $CO_2$, a final reaction mass containing substantially no sodium acid carbonate may be obtained if desired. In view of permissibly variable conditions, especially as to strength of starting solution and gas compositions, it is not possible to indicate fixed retention time applicable to all situations. However, the gas contacting operation is usually continued until not more than 6%, and preferably not more than 3%, by weight of combined sodium present in the reaction mass is held in combination as sodium acid carbonate.

Figs. 1 and 2 of the drawing diagrammatically show apparatus in which two embodiments of the invention may be carried out. In Fig. 1, 10 indicates a closed reactor provided with an agitator 11 and a draw-off pipe 12 having a valve 13. Sodium carbonate solutions are charged into the reactor from tank 15 thru valved pipe 17. Temperature conditions in the reactor may be maintained by any controllable indirect heating means, e. g. a steam jacket 18. $H_2S$ gas from a source 20 is fed into the bottom of the reactor thru line 21 and bubbled upwardly thru the liquor by any suitable gas distributing means not shown. Pressure conditions in the reactor may be regulated by valve 23 and valve 24 in tail gas line 25.

In operation sodium carbonate solution is fed into the reactor in quantity sufficient to fill the reaction chamber to about two-thirds capacity, and gas flow and agitation are started. Production of NaHS proceeds. During early stages of reaction there are formed relatively large amounts of sodium acid carbonate some of which is in solid phase, but in accordance with the invention, most or if desired substantially all of the sodium acid carbonate may be broken down under the stated conditions of reaction to $CO_2$ and $Na_2CO_3$ which then becomes available for reaction with more $H_2S$ to form NaHS. As reaction progresses the quantity of NaHS present increases, the sodium acid carbonate content decreases, and as the liquor becomes relatively concentrated as to NaHS, some anhydrous $Na_2CO_3$ precipitates. Along toward the latter stages of gassing, the reaction mass comprises NaHS, Na$_2$CO$_3$ and more or less sodium acid carbonate in solution, and anhydrous Na$_2$CO$_3$ in suspension.

Time interval during which the liquor is retained in the reaction zone varies considerably depending upon the strength of the sodium carbonate starting solution, the H$_2$S content of the incoming gas, and upon whether or not such gas contains appreciable amounts of CO$_2$. As indicated it is preferred to continue the gassing operation until not more than 6%, and preferably not more than 3% by weight of the combined sodium present is held in combination as sodium acid carbonate. With pure H$_2$S gas or a gas containing substantially no CO$_2$ it is possible, without requiring impractically long gassing time, to reduce the sodium acid carbonate content to a negligible quantity. When using a substantially saturated starting solution and a substantially pure H$_2$S gas, retention time of an increment of liquor in the reactor may vary from 4 to 10 hours, such interval being longer in instances in which the starting solution is not saturated and the H$_2$S gas contains inert diluent gases or CO$_2$. If the starting solution is substantially saturated, and the H$_2$S gas is either pure or contains inert diluents, it is possible to produce in the reactor solutions containing as much as 23% by weight of NaHS, and substantially no sodium acid carbonate. In average operations of this nature, conversion of original Na$_2$CO$_3$ to NaHS may vary from 40 to 80% by weight, 3 to 10% of original Na$_2$CO$_3$ may be present in solution as NaHCO$_3$, and 25 to 50% of the incoming Na$_2$CO$_3$ may be unchanged. Of the ultimately unreacted Na$_2$CO$_3$, about 15 to 30% may be in the form of anhydrous Na$_2$CO$_3$ precipitate, and 70 to 85% may be held in solution.

In most cases it is not particularly desirable to prolong gassing sufficiently to reduce the sodium acid carbonate content of the reacted liquor to substantially zero. Hence at the end of usual gassing operations, the mass ordinarily contains NaHS, Na$_2$CO$_3$ and some sodium acid carbonate in solution, and solid Na$_2$CO$_3$ in suspension. Inflow of H$_2$S gas is stopped, valve 13 is opened and the reaction mass is run into filter 30 in which solid Na$_2$CO$_3$ is filtered out, thus producing in line 31 a filtrate containing NaHS, sodium acid carbonate and Na$_2$CO$_3$, all in solution.

In accordance with one phase of the invention, we have found that liquors of this type cannot be concentrated by the usual evaporation methods in the presence of sodium acid carbonate, without loss of NaHS, since it appears that on heating, sodium acid carbonate causes decomposition of NaHS with resultant formation of Na$_2$CO$_3$ and H$_2$S. We find that sodium acid carbonate should be removed substantially completely from the reacted liquor in any suitable way. If the reacted liquor contains only a small amount of NaHCO$_3$, removal of this material may be accomplished, for example, by treating such liquor with caustic soda, resulting in conversion of acid sodium carbonate to Na$_2$CO$_3$ and water. When reacted liquor contains substantial amount of NaHCO$_3$, more satisfactory and economical separation of sodium acid carbonate may be obtained by first cooling the hot reacted liquor to about 25° C. in cooler 32. At such temperature, most of the acid sodium carbonate precipitates and may be separated out by filter 34. The filtrate then contains only about 0.2–1.0% acid sodium carbonate which may be converted to Na$_2$CO$_3$ and water by treating the filtrate in tank 35 with a small amount of caustic soda, the sodium acid carbonate is removed from the system without materially increasing the Na$_2$CO$_3$ content of the liquor.

Following elimination of acid sodium carbonate, the liquor may be concentrated in evaporator 37 as desired to strength of about 50% NaHS. During such concentration, which may be effected by heating the liquor at atmospheric pressure to about 150° C., most of the Na$_2$CO$_3$ precipitates, settles out and may be removed by filter 38. The resulting relatively strong NaHS filtrate ordinarily contains in solution about 0.2–0.3% Na$_2$CO$_3$ in solution. Such residual Na$_2$CO$_3$ may be removed in any suitable way if a substantially pure NaHS end product is desired. If the end product desired is Na$_2$S, the NaHS liquor may be treated with NaOH to convert all or any portion of the NaHS to Na$_2$S. Alternatively, NaHS or Na$_2$S may be produced in solid form by evaporation of the liquors and solidification by known methods.

The sodium acid carbonate by-products, if any, may be decomposed by steam treatment to Na$_2$CO$_3$ which, along with any other Na$_2$CO$_3$ by-product, may be returned to the process.

In the embodiment of Fig. 2, H$_2$S gassing is carried out in a tower-like reactor 42 in which liquor and gas are contacted in countercurrent relation. Because of formation of some solid acid sodium carbonate in the early stages of gassing and formation of anhydrous Na$_2$CO$_3$ in later stages of gassing, it is not feasible to carry out the NaHS producing reaction in the more or less usual type of packed gas contacting towers. An open spray tower, containing no packing and provided at the top with a head for introducing a relatively light slurry and at the bottom with an inlet for H$_2$S gas, may be employed. A tower containing baffles 43 such as indicated on the drawing may be used, although in such instance the baffle arrangement should be such as to afford good contact of gas and liquor but at the same time permit retarded downflow of a relatively light slurry and discharge of all of the slurry from the bottom of the tower.

In the general operation of the modification of Fig. 2, valve 44 is closed, and the system comprising tower 42, slurry pump 45 and return pipe 46 is filled with starting solution. Temperatures and pressures in the reactor are adjusted as described, and the liquor is circulated over tower 42 in countercurrent contact with H$_2$S gas for a time interval comparable with retention time described in connection with Fig. 1. Thereafter valve 47 is closed, valve 44 is opened, and the batch is run into filter 47', solid Na$_2$CO$_3$ filtered out, and the filtrate from line 48 is purified as before. If desired, in the later stages of gassing after most of any solid acid carbonate formed has been decomposed and returned to solution, the liquor effluent of tower 42 may be run directly thru a filter, solid Na$_2$CO$_3$ filtered out, and the filtrate returned to the top of the tower.

In one example of operation of a baffled reactor similar to tower 42, a saturated solution of Na$_2$CO$_3$ was run into the top, and temperature of about 105° C. and pressure of about 15 lbs. gauge were maintained. Rate of introduction of saturated Na$_2$CO$_3$ solution and height of the tower were such that retention time in the tower of each increment of liquor was about 17 minutes. Pure H$_2$S gas was used. Anhydrous Na$_2$CO$_3$ precipitated in the tower. In a single pass, liquor containing 10% NaHS was produced, this corresponding to a 31% conversion of the original $Na_2CO_3$ to sulphide. About 5% by weight of the incoming $Na_2CO_3$ was converted to $NaHCO_3$, and 64% of the $Na_2CO_3$ charged remained unchanged, 20% in solid phase and 44% in solution. This particular liquor was recycled four times over the tower under conditions the same as in the original pass. Between each recycling of liquor, solid material formed in the previous pass was filtered out. The final product contained 18% by weight of NaHS, and no $NaHCO_3$. Of the original $Na_2CO_3$, about 55% was converted to NaHS, 8% was precipitated as $Na_2CO_3$, and 37% remained in solution in the liquor.

Two copending applications, of Charles L. Koenig, Serial No. 527,143 and Arthur W. Saddington, Serial No. 538,101, both assigned to the same common assignee as this application and both directed to subject matter related to this application, were filed on March 18, 1944, and May 30, 1944, respectively.

We claim:

1. The method of producing sodium hydrosulphide which comprises forming an aqeous solution containing $Na_2CO_3$, contacting said solution with gas containing $H_2S$ and an amount of $CO_2$ ranging from none to a volume equal to half of the volume of the $H_2S$ content of said gas, and maintaining, during said contacting operation, temperature not less than 100° C. and not more than 125° C., thereby forming sodium hydrosulphide.

2. The method for producing sodium hydrosulphide which comprises forming an aqueous solution containing $Na_2CO_3$, contacting said solution with gas containing $H_2S$ and an amount of $CO_2$ ranging from none to a volume equal to half of the volume of the $H_2S$ content of said gas, maintaining during said contacting operation, temperature not less than 100° C. and not more than 125° C., and carrying out the contacting operation under conditions such as to prevent any substantial loss of water from said solution, thereby forming sodium hydrosulphide.

3. The method for producing sodium hydrosulphide which comprises forming an aqeous solution containing $Na_2CO_3$, contacting said solution with gas containing $H_2S$ and an amount of $CO_2$ ranging from none to a volume equal to the volume of the $H_2S$ content of said gas, and maintaining, during said contacting operation, temperature not less than 100° C., thereby forming sodium hydrosulphide.

4. The method for producing sodium hydrosulphide which comprises forming an aqueous carbonate of sodium solution having a sodium salt content at least predominantly $Na_2CO_3$, contacting said solution with gas containing $H_2S$ and an amount of $CO_2$ ranging from none to a volume equal to the volume of the $H_2S$ content of said gas, and maintaining, during said contacting operation, temperature not less than 100° C. and not more than 125° C., thereby forming sodium hydrosulphide.

5. The method for producing sodium hydrosulphide which comprises forming an aqeous carbonate of sodium solution having a sodium salt content at least predominantly $Na_2CO_3$, contacting said solution with gas containing $H_2S$ and an amount of $CO_2$ ranging from none to a volume equal to the volume of the $H_2S$ content of said gas, and maintaining, during said contacting operation, temperature not less than 105° C. and not more than 115° C., thereby forming sodium hydrosulphide.

6. The method for producing sodium hydrosulphide which comprises forming an aqueous solution containing $Na_2CO_3$, contacting said solution with gas containing $H_2S$ but substantially no $CO_2$, and maintaining, during said contacting operation, temperature not less than 100° C., thereby forming sodium hydrosulphide.

7. The method for producing sodium hydrosulphide which comprises forming an aqueous solution containing $Na_2CO_3$, contacting said solution with gas containing $H_2S$ but substantially no $CO_2$ while maintaining temperature not less than 100° C. and not more than 125° C., carrying out the contacting operation under conditions such as to prevent any substantial loss of water from said solution, thereby forming sodium hydrosulphide, and continuing said contacting operation until not more than 6% by weight of combined sodium present is held in combination as sodium acid carbonate.

8. The method for producing sodium hydrosulphide which comprises forming a substantially saturated aqueous solution of $Na_2CO_3$, contacting said solution with gas containing $H_2S$ but substantially no $CO_2$, maintaining, during said contacting operation, temperature not less than 100° C. and not more than 125° C., and continuing said contacting operation until not more than 6% by weight of sodium present is held in combination as sodium acid carbonate.

9. The method for producing sodium hydrosulphide which comprises forming a substantially saturated aqueous solutiton of $Na_2CO_3$, contacting said solution with gas containing $H_2S$ but substantially no $CO_2$, maintaining, during said contacting operation, temperature not less than 105° C. and not more than 115° C. and pressure conditions such as to prevent any substantial boiling of said solution, thereby forming sodium hydrosulphide, and continuing said contacting operation until not more than 3% by weight of sodium present is held in combination as sodium acid carbonate.

10. The method for producing sodium hydrosulphide which comprises forming a substantially saturated aqueous solution of $Na_2CO_3$, contacting said solution with substantially pure $H_2S$ gas, maintaining, during said contacting operation, temperature not less than 105° C. and not more than 115° C. and pressure conditions such as to prevent any substantial boiling of said solution, thereby forming sodium hydrosulphide, and continuing said contacting operation until not more than 3% by weight of sodium present is held in combination as sodium acid carbonate.

11. The method for producing sodium hydrosulphide which comprises forming an aqueous solution containing $Na_2CO_3$, contacting said solution with gas containing $H_2S$ and an amount of $CO_2$ ranging from none to a volume equal to half of the volume of the $H_2S$ content of said gas, maintaining, during said contacting operation, temperature not less than 100° C. and not more than 125° C., thereby forming a reaction liquor containing NaHS, $Na_2CO_3$ and sodium acid carbonate in solution and solid $Na_2CO_3$ in suspension, separating solid $Na_2CO_3$ from the solution containing NaHS, substantially completely removing sodium acid carbonate from said NaHS solution, and then concentrating said solution.

12. In the method of producing sodium hydrosulphide involving $H_2S$ gassing of an aqueous solution containing $Na_2CO_3$ with formation of a reaction liquor containing NaHS, $Na_2CO_3$ and sodium acid carbonate in solution, the improvement comprising substantially completely removing sodium acid carbonate from said NaHS liquor, and then concentrating said liquor.

13. In the method of producing sodium hydrosulphide involving $H_2S$ gassing of an aqueous solution containing $Na_2CO_3$ with formation of a heated reaction liquor containing NaHS, $Na_2CO_3$ and sodium acid carbonate in solution, the improvement comprising cooling said liquor sufficiently to effect precipitation of most of the sodium acid carbonate, separating solid sodium acid carbonate from said NaHS liquor, and then concentrating said liquor.

14. In the method of producing sodium hydrosulphide involving $H_2S$ gassing of an aqueous solution containing $Na_2CO_3$ with formation of a heated reaction liquor containing NaHS, $Na_2CO_3$ and sodium acid carbonate in solution, the improvement comprising cooling said liquor sufficiently to effect precipitation of most of the sodium acid carbonate, separating solid sodium acid carbonate from said NaHS liquor, concentrating said liquor by heating whereby $Na_2CO_3$ precipitates, and separating solid $Na_2CO_3$ from said liquor.

ARLIE PAUL JULIEN.
GEORGE N. TERZIEV.